US00RE36065E

United States Patent [19]

Andrews et al.

[11] E Patent Number: Re. 36,065

[45] Reissued Date of Patent: Jan. 26, 1999

[54] COAX CONNECTOR MODULE

[75] Inventors: Derek Andrews, Vimkel, Netherlands; Georg Mayer, Tittmoning, Germany

[73] Assignee: Berg Technology, Inc., Reno, Nev.

[21] Appl. No.: 351,673

[22] Filed: Dec. 8, 1994

Related U.S. Patent Documents

Reissue of:

[64] Patent No.: 5,169,343
Issued: Dec. 8, 1992
Appl. No.: 799,531
Filed: Nov. 27, 1991

[30] Foreign Application Priority Data

Nov. 29, 1990 [NL] Netherlands ..... 9002612

[51] Int. Cl.[6] ..... H01R 13/648

[52] U.S. Cl. ..... 439/608; 439/63; 439/581

[58] Field of Search ..... 439/578–585, 439/63, 607–610, 108

[56] References Cited

U.S. PATENT DOCUMENTS

| | | | |
|---|---|---|---|
| 3,128,138 | 4/1964 | Noschese | 439/579 |
| 3,366,920 | 1/1968 | Laudig et al. | 339/177 |
| 4,451,107 | 5/1984 | Dola et al. | 339/143 R |
| 4,548,453 | 10/1985 | Mummey et al. | 339/17 C |
| 4,598,961 | 7/1986 | Cohen | 439/63 |
| 4,605,269 | 8/1986 | Cohen et al. | 439/63 |
| 4,861,271 | 8/1989 | Bogar et al. | 439/63 |
| 4,895,521 | 1/1990 | Grabbe | 439/579 |
| 4,900,258 | 2/1990 | Hnatuck et al. | 439/63 |
| 4,941,831 | 7/1990 | Tengler et al. | 439/63 |
| 4,946,392 | 8/1990 | Kobler et al. | 439/63 |
| 5,011,425 | 4/1991 | Van Zanten et al. | 439/353 |

FOREIGN PATENT DOCUMENTS

| | | |
|---|---|---|
| WO 87/07441 | 12/1987 | WIPO . |
| WO 90/09686 | 8/1990 | WIPO . |

*Primary Examiner*—J. J. Swann
*Attorney, Agent, or Firm*—Woodcock Washburn Kurtz Mackiewicz & Norris LLP

[57] ABSTRACT

A coax connector module comprising a housing accommodating electrically conducting coax contact elements. Each contact element having a contact side in the form of a coaxial inner and outer contact part, and a connecting side in the form of an electrical terminal and in electrically conducting casing surrounding the terminal in an electrically insulating manner. The electrical terminal being connected to the inner contact part and having a connecting end, and the casing being connected to the outer contact part and having at least one connecting end, for mounting on a printed circuit board. The casing being constructed from walls of sheet metal or a machined block of metal. To reduce the pitch distance between the respective connecting ends of adjacent casings, one or more of the walls of adjacently situated casings can be of integral or partially common construction.

26 Claims, 4 Drawing Sheets

COAX CONNECTOR MODULE

Matter enclosed in heavy brackets [ ] appears in the original patent but forms no part of this reissue specification; matter printed in italics indicates the additions made by reissue.

*This is a reissue of U.S. Pat. No. 5,169,343, Ser. No. 07/799,531, filed Nov. 27, 1991.*

BACKGROUND OF THE INVENTION

The invention relates to a coax connector and more particularly to a coax connector module with a plurality of shielded electrical contact elements wherein each contact element has, a contact end formed of coaxial inner and outer contact pans and a connecting end for mounting on a printed circuit board.

When using high frequency (HF) signals, it is particularly important to electrically shield the terminal connected to the inner part of the coaxial contact element in order to avoid interference and electromagnetic stray or leakage fields around the terminal. PCT International Publication No. WO 87/07441 published Dec. 3, 1987 discloses a shielded electrical connector comprising a housing having a plurality of housing sections of conductive material, each having a plurality of retaining channels for accommodating the contact elements and terminals disposed therein. Such a housing is in practice relatively expensive to manufacture because of the plurality of housing sections of conductive material, whether or not coated with insulating material, and the fact that the housing is designed for a specific connector embodiment having, for example, a specific number of contact elements.

PCT International Publication No. WO 90/09686 published Aug. 23, 1990 discloses a metallic shielding shell for placement over an isolated terminal. The shell only partially encloses the terminal and is in electrical contact with a ground terminal of the connector. With such a separate shielding shell, the signal terminal, which is the terminal connected to the inner contact part of a coaxial contact element, is not totally enclosed. Interference signals can therefore be superimposed on the various information signals communicated via the contact element. Also stray radiation and accordingly mutual interference between adjacent contact elements is not eliminated with the shielding shell disclosed.

SUMMARY OF THE INVENTION

The object of the invention is to provide a coax connector module having shielding means which can be manufactured with a greater design flexibility, which is not restricted to a specific number of contact elements, which maximizes shielding and which is less expensive to make than prior coaxial connectors.

The coax connector module of the present invention includes a housing in which a plurality of electrical contact elements are arranged. The housing has a contact side wherein the contact ends of the contact elements are disposed and a connecting side wherein the connecting ends of the contact elements project. The contact end of each contact element is in the form of coaxial inner and outer contact parts. The connecting end of the contact elements are adapted for mounting on a printed circuit board. An electrical terminal is connected to the inner coaxial contact part. The other end of the terminal forms the connecting end of the contact element for mounting on a printed circuit board. An electrically conducting casing or shielding member encloses the terminal in an electrically insulating manner, the casing having at least one or preferably a pair of connecting ends for mounting on a printed circuit board.

The casing or shielding member of the present invention completely surrounds the signal terminal of the coax contact element which maximizes the shielding effect. The casing itself is advantageously provided with connecting end for grounding.

The use of shielding casings is especially of advantage in another embodiment of the present invention wherein a coax connector module has a plurality of contact elements arranged in rows and columns, and one or more walls or wall parts disposed between the respective connecting ends of adjacent casings of the contact element in a column are of integral or partially common construction.

The common construction of one or more walls results in a reduction of the pitch distance between the respective connecting ends of adjacent casings. As a result, less space is needed for mounting the connector module on a printed circuit board. This is important in view of the present trend towards miniaturization of electrical components and apparatus which on the one hand makes the printed circuit boards smaller and on the other hand accommodates as many components as possible on a board of standard dimensions. In particular, the connector module according to the invention is suitable for a pitch distance of 3.5 mm.

In yet another embodiment of the connector module according to the invention, the plug-in direction is disposed parallel to the plane of the board. The shielding members or casings are of a box-type and essentially L-shaped, having a first and second leg. The outer contact part of a contact element is connected to the free end of the first leg. At least one connecting end of the casing is situated at the free end of the second leg, and the oppositely situated walls of the second leg of adjacent casings are of integral or partially common construction.

In order to make possible a universal assembly of, on the one hand, the housing provided with the contact elements and, on the other hand, the casings provided with solder or press-fit ends, yet another embodiment of the present invention provide box-type casings with projecting parallel lips for electrically contacting and mechanically connecting a casing to the outer coaxial contact part of a contact element. Preferably, the lips are formed by two oppositely situated walls of the casing and are mechanically and electrically connected to the outer contact part of a respective contact element by spot welding.

The casing or shielding member according to the invention can be formed relatively simply and rapidly from sheet metal by pressing or punching and suitably modelling, without the need for special machines. This has a favorable effect on the cost price of the casings and, consequently, on the connector module as a whole.

However, the casing according to the invention can be formed also from a block of metal, which is machined by milling and drilling to form one or more connecting ends and having one or more inner channels, in each of which a terminal for contacting the inner part of a coax contact element is arranged in an electrically insulating manner with respect to the casing.

In a preferred embodiment, the coax connector module, the casing and terminal and the corresponding coaxial inner and outer contact parts of one or more contact elements form a separate unit to he arranged in the housing. The unit and housing have means for mutually locking with one another. These locking or latching means may comprise lips having a free end radially projecting from the outside surface of an outer contact part of a contact element. These free ends each engage in the assembled state in a recess in the housing of the connector module.

It should he evident that such a separate unit (for example, a unit of two contact elements making up a row of coax connector module) will provide for a very flexible and universal assembly or connector modules, independent of the number of rows of such a connector housing.

The connecting ends of the conductor and the chasing may be formed for a solder connection (either through hole or surface mount) in the circuit board hole. Alternatively, the connecting ends may be formed as a "press fit" electrical terminals for compliant press-fit connection in plated-through holes.

The invention is explained in greater detail below on the basis of a number of exemplary embodiments, with reference to the drawings.

DETAILED DESCRIPTION OF THE EMBODIMENTS

Figure 1:
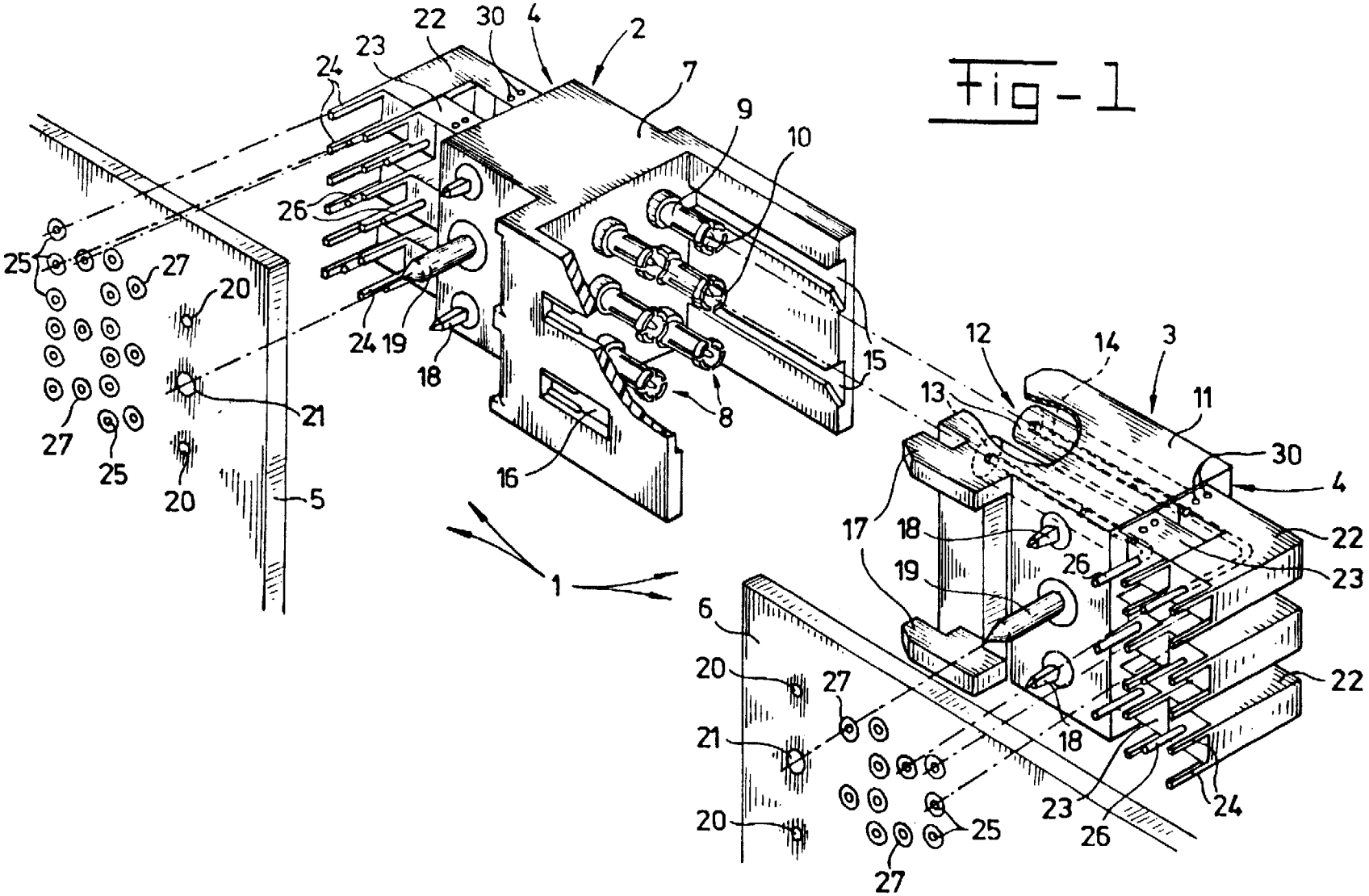
FIG. 1 shows, diagrammatically and in perspective, coax connector modules to be mutually coupled and having shielding cases constructed from sheet metal for mounting on a printed circuit board according to the invention.

In FIG. 1, the reference number 1 shows a cut connector module assembly composed or two coax connector modules 2, 3 to be connected to each other and having a connecting side 4 for mounting on, respectively, a printed circuit board 5, 6.

The coax connector module 2 is constructed of a plastic housing 7, a portion of which is shown broken away for the sake of clarity. In this exemplary embodiment, the housing 7 carries two rows each containing three coax contact elements 8 composed of a cylindrical outer contact part 9 which surrounds a pin-type inner contact part 10, both of electrically conducting material.

The coax connector module 3 to be coupled to the coax connector module 2 comprises a housing 11, a portion of which is shown broken away for the sake of clarity, having two rows of three coax contact elements 12. Each coax-contact element 12 comprises a cylindrical outer contact part 13 which surrounds a tubular inner contact part 14 shown in broken lines, both of electrically conducting material.

The housing 7 of the coax connector module 2 is provided with grooves 15 which interact with projections in the housing 11 of the connector module 3 (which are not shown). These projections and grooves effect a suitable guide for contacting the connectors to be coupled. The possibility is also avoided that, with a plurality of adjacently mounted connectors, an incorrect contacting may occur because a connector to be coupled partly makes contact to one connector and partly makes contact to the adjacent connector (anti-mismatch guard). The housing 7 is furthermore provided with locking slots 16 in which locking projections of locking means such as, for example, those shown in U.S. Pat. No. 5,011,425 issued Apr. 30, 1991 and assigned to the same assignee as the present application, engage in the contacted state. Furthermore, coding blocks can also be incorporated in the slots 16 for interaction with matching coding blocks to be received in the housing 11, for which purpose the housing 11 is provided with hook-type projections 17, all these features, being as illustrated in the aforenoted U.S. Pat. No. 5,011,425.

To locate the coax connector modules 2, 3 on a printed circuit board, the respective housings 7, 11 are provided, as shown, with positioning pins 18, 19. In the mounted state, the pins 18, 19 engage in correspondingly situated locating hole, 20, 21 in the respective printed circuit boards 5, 6.

The box-type casings 22, 23 situated at the connecting side 4 of the coax connector modules 2, 3 which casings are connected to the outer contact part 13 of the associated contact element 8, 12, are each provided with two pin-type connecting ends 24 for connecting them to the respective printed circuit board 5, 6. For this purpose, the printed circuit boards 5, 6 are provided with correspondingly situated connecting holes 25. To connect the inner contact parts 10, 14 of a contact element 8, 12, a connecting end 26 extends outward from the casings 22, 23, the board 5, 6 being provided with correspondingly situated contact holes 27.

It will be clear that the connector module 2 may also be provided with coax contact elements 12 or a combination of coax contact elements 8, 12. This applies, of course, to the connector module 3. If desired, the housings 7, 11 may be provided with more or less than two rows of three contact elements, according to the requirements. The contact elements 8, 12 of the coax connector modules 2, 3 may, of course, be contacted by coaxial cables provided with suitable coax plugs, for example provided with locking means such as those shown in the above mentioned U.S. Pat. No. 5,011,425.

Figure 2:
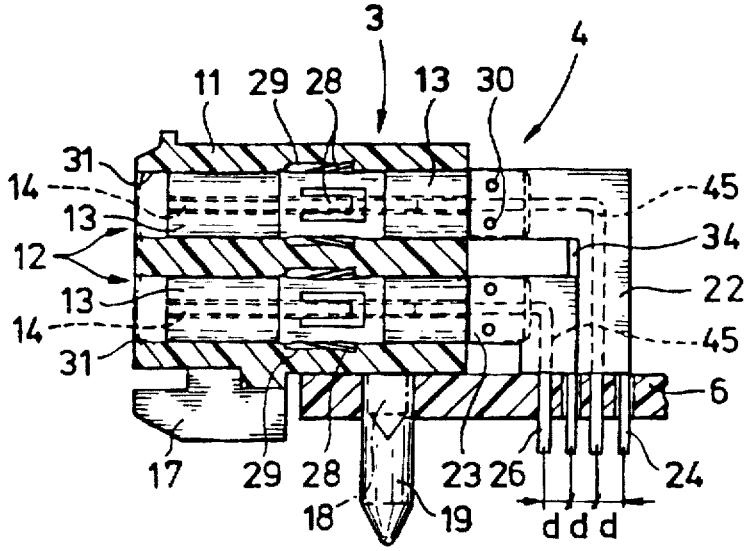
FIG. 2 shows diagrammatically a cross-sectional view of the coax connector module shown in the right-hand part of FIG. 1.

In the cross-sectional view of FIG. 2 of the coax connector module 3 according to FIG. 1, some components art shown in broken lines for the sake of clarity. The outer contact part 13 of the contact element 12 is extended so as to project outside the housing 11 in the direction of the connecting ride 4, the box-type casings 22 and 23, respectively, being electrically and mechanically connected by means of spot welds which are diagrammatically indicated by open circles 30. The contact elements 12 are accommodated in channels 31 formed separately in the housing 11, which channels are provided on the inside along the circumference with one or more recesses 29 in which the radially projecting lips 28 for locking the contact elements 12 to the housing 11 can engage.

In FIG. 2 it can clearly be perceived that, in this embodiment of the invention viewed from the contact side or the contact element 12, the rear wall of the casing 23 partially forms the front wall of the adjacent casing 22. As a consequence of the measure, the connecting ends 24, 26 associated with the casings 22, 23 can be arranged in a simple manner at an equal mutual pitch distance d, for example a pitch distance of 4 mm.

Figure 3:
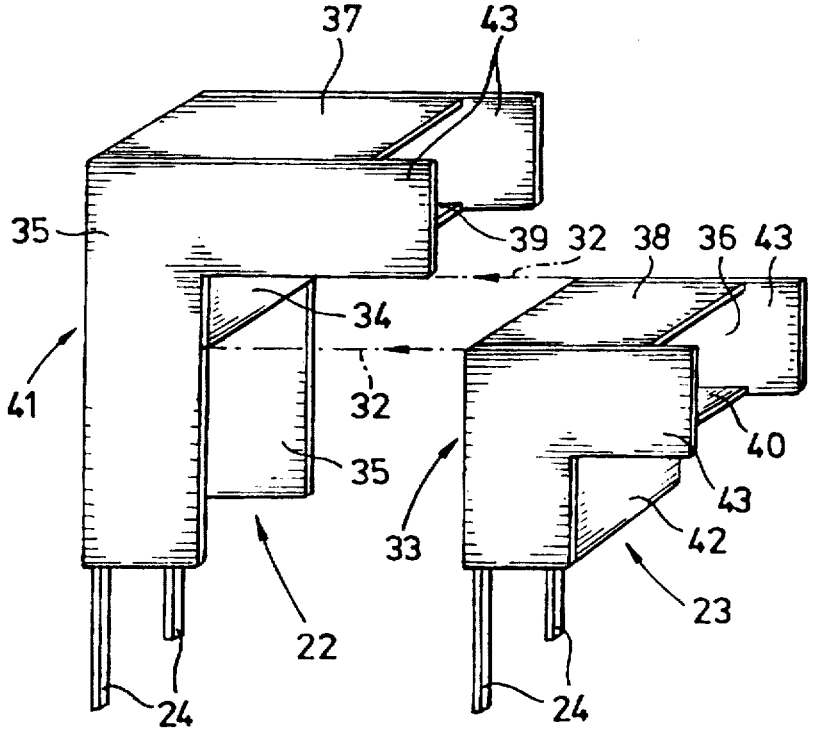
FIG. 3 shows, diagrammatically and in perspective, the casing according to the invention used in FIG. 1 on an enlarged scale.

FIG. 3 shows, in perspective and on an enlarged scale, the L-shaped casings 22, 23 manufactured from sheet metal. In the embodiment shown, the casings 22 and 23 are assembled from side walls 35, 36 to which a top wall 37, 38 and, if necessary, a bottom wall 39, 40, respectively, connect. As suggested by arrows 32, in the mounted state the rear wall 33 or the casing 23, viewed in the direction of the arrow, contacts to the front wall 35 of the casing 22. The rear wall 33 of the casing 23 consequently effects, together with the front wall 34, a portion of the shielding of the casing 22. The casing 22 is furthermore provided with a rear wall 41 and the casing 23 is, provided with a front wall 42, all these feature being such that, in the mounted state or the two casings, the respective terminals 45 are completely surrounded by sheet metal, which terminals or conductors 45 are shown in broken lines in FIG. 2.

For mounting on a printed circuit board, the casing 22, 23 are each constructed with connecting ends 24, integrated with the respective rear wall 41, 33, in the form of connecting pins for connecting them to the printed circuit by soldering. The side walls 33, 36 are extended to form parallel lips 43 for electrically and mechanically connecting the casings 22, 23 to the outer contact parts 9, 13 of a contact element 8 or a contact element 12, respectively. One or more of the walls of the casings 22, 23 may be formed by folding from one single metal sheet. The other walls may, if necessary, be connected thereto by soldering or welding, so that an optimal shielding action of the respective conductor against electromagnetic interferences is obtained.

Figure 4:
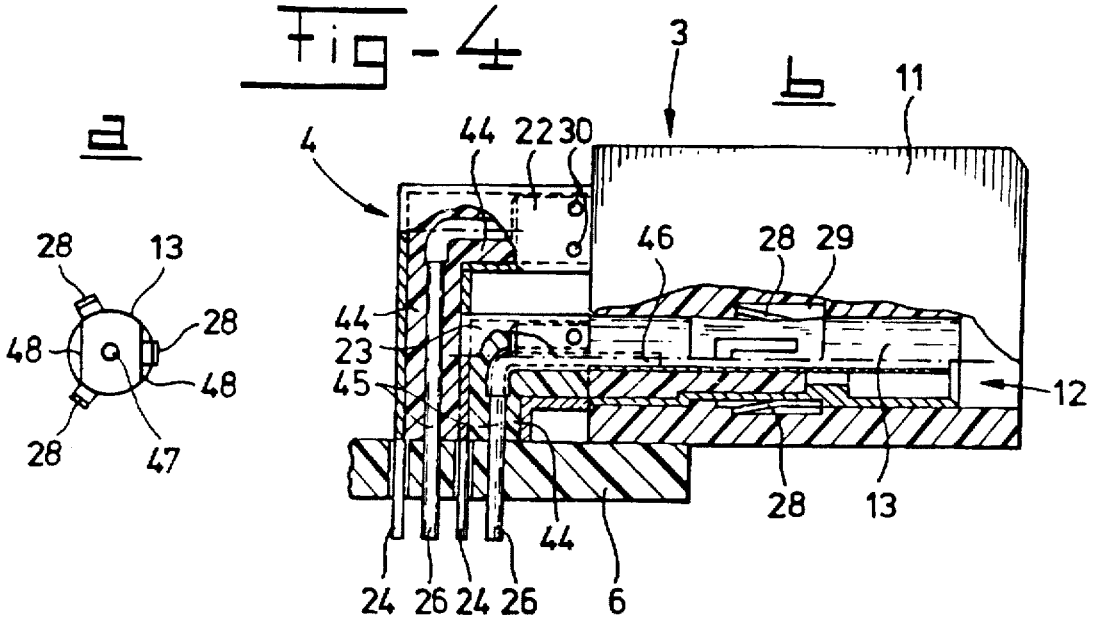
FIGS. 4a and 4b respectively, show diagrammatically a side view of the coax connector module illustrated in the right-hand part of FIG. 1 on an enlarged scale and partially broken away and a partial view towards the connecting side of the housing.

FIG. 4a shows, partially broken away and on an enlarged scale, the cross section according to FIG. 2, in which the connection or the casing 22, 23 to the outer contact part 13 and the connection of the terminal 45, surrounded by a casing 22, 23 to the inner contact part 14 of a contact element 12 are shown partially broken away. FIG. 4b shows a partial view towards the housing 11 from the connecting side 4 thereof, without casings 22, 23 mounted.

As already described above, the casings 22, 23 are electrically and mechanically connected to the outer contact part 9, 13, extended towards the connecting side of a respective contact element 8, 12 by spot welds 30. The terminal 45 located by means of electrical insulation 44 in a casing 22, 23 has a connecting end 26, projecting outside the associated casing, in the form of a connecting pin for solder mounting on a printed circuit board and another connecting end 46 which engages as a plug pin in the portion, designed as contact socket 47 projecting towards the connecting side 4 of the respective module 3, of the inner contact part 14, 10 of a contact element 12, 8 respectively (FIG. 1).

FIG. 4b shows a view or a contact element 12 from the connecting side 4 of the housing 11 of the coax connector module 3. The contact socket 47 can be clearly perceived therein. It can also be seen that the outer contact part 13, extended to the connecting side 4, is flattened at the sides, where the lips 43 of the respective casings 22, 23 engage, as indicated by the reference numeral 48. These flattened parts 48 produce a convenient, electromagnetically sealed connection of the casings 22, 23 to the respective outer contact part 13. If desired, the connection of the lips 43 to the respective outer contact part 9, 13 may also be constructed as a locking plug/socket connection, so that the casings 22, 23 can be coupled electrically and mechanically to their respective terminal 45 as a whole in the form of a plug connection having a housing 7, 11 provided with coax contact elements 8, 12 by plugging-on.

Figure 5:
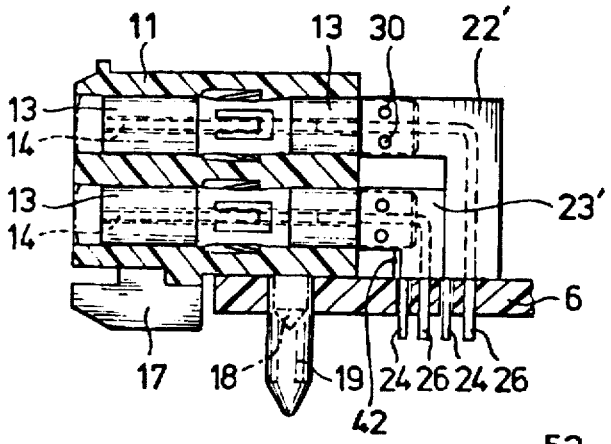
FIG. 5 shows diagrammatically a cross-sectional view of a coax connector module according to the invention by analogy with FIG. 2, having a modified embodiment of the casings.

FIG. 5 shows a variant by analogy with the cross section according to FIG. 2, in which, viewed in the plug-on direction of the module, the front wall 34 of the respective casing 22' is of common construction for the two casings (see also FIG. 3). Note also the offset position of the connecting ends 24 of the casings 22', 23' with respect to FIG. 1, 2 or 3. It will be clear that, although not shown, other opposite walls of the adjacent casings can be of common construction.

Figure 6:
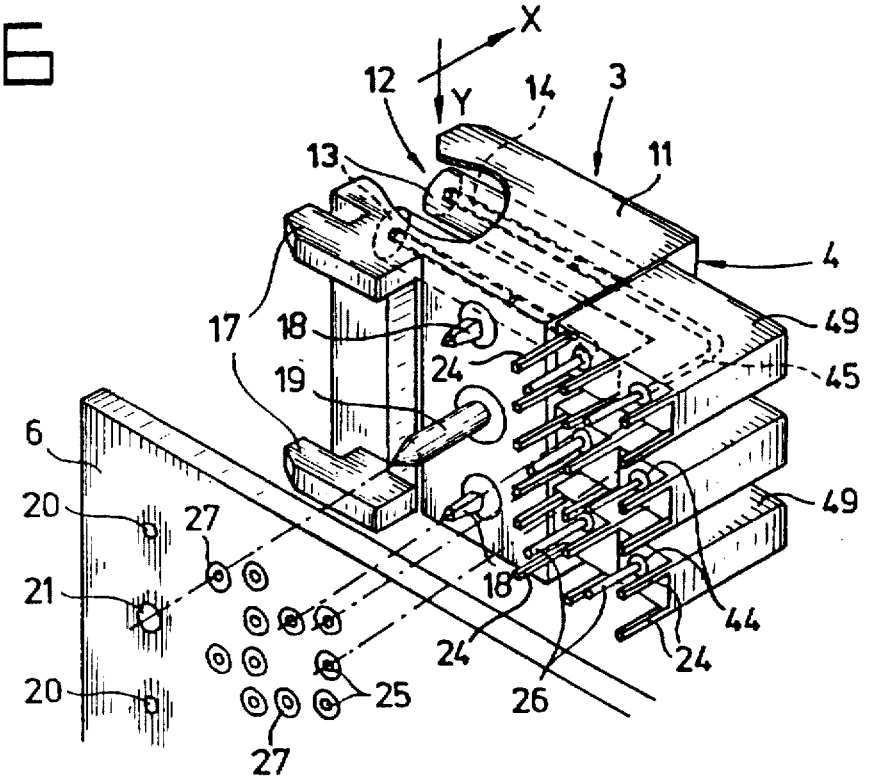
FIG. 6 shows diagrammatically and in perspective, by analogy with the right hand part of FIG. 1, a coax connector module having shielding cases constructed from a machined block of metal for mounting on a printed circuit board according to the invention.

FIG. 6 shows another variant of a coax connector module according to the invention, in which the casings 49, belonging to the contact elements 12 in a column (x-direction in FIG. 6) are of integral type and formed from a machined block of metal. The contact elements 12 form rows in Y-direction.

Figure 7:
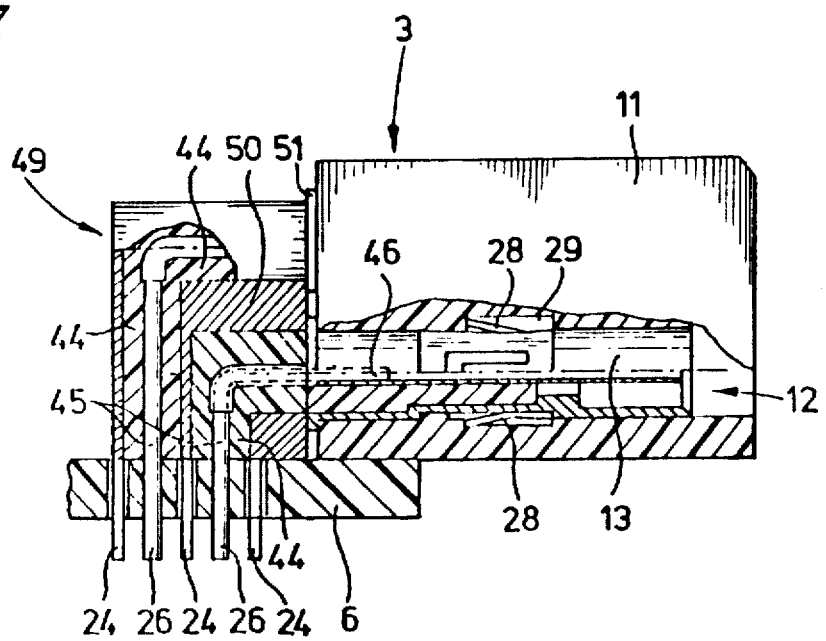
FIG. 7 shows diagrammatically a cross-sectional view or the coax connector module according to FIG. 6.

FIG. 7 shows partly a cross-sectional view of the embodiment according to FIG. 6 having a casing 49 formed of a block of metal 50. In this block 50 [channels] *passages* are milled and drilled for receiving the terminals 45. The terminals 45 are surrounded by electrical insulation 44, in order to electrically isolate the terminals 45 from the walls of the block 50. The outer contact part 13 of a contact elements 12 is provided with a flange 51 by means of which the contact element is connected to the block 50, for example by soldering or spot-welding.

Particularly in right-angled blocks 50 of reduced dimensions, the insertion of the terminals 45 may be difficult to achieve, due to their bending. In such cases, a terminal 45 may be composed of two straight pieces, inserted from the respective openings of the [housing] *casing* 49 and electrically connected to each other, for example by soldering, at their meeting point. For this purpose, the block 50 may be provided with a hole running from the outright surface to this meeting point. After connection of the terminal pieces, the hole is filled up with insulating material and closed by a metallic cover.

The casing and associated contact elements can be provided as an integral part for mounting with the housing for forming the connector module according to the invention.

Figure 8:
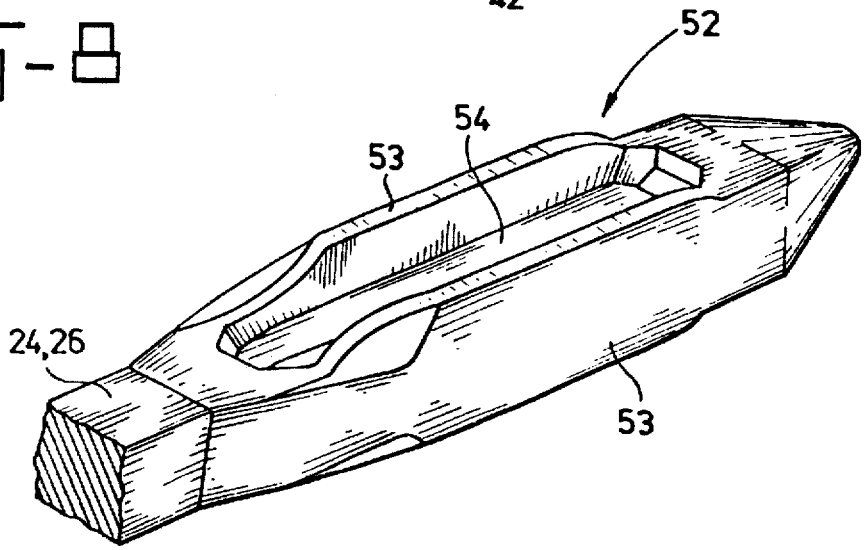
FIG. 8 shows, diagrammatically and in perspective, a press-fit connecting end suitable for use in the invention on an enlarged scale.

FIG. 8 shows an embodiment of a so-called "press-fit" connecting end 52 for mechanically locked assembly in a plated-through hole in a printed circuit board. The respective connecting ends 24, 26 are in this case provided with fins 53 which connect to a base 54. The press-fit connecting end consequently has an H-shaped cross-section. For a more detailed description, reference is made to U.S. Pat. No. 4,729,174, also assigned to the same assignee as the present application.

The invention has been illustrated above on the basis of exemplary embodiments in which the casings are designed for use with modules whose plug-on direction is parallel to the surface of the printed circuit board (right-angled). It will be clear that the invention can be used with the same advantage in the case of coax connector modules for mounting on a printed circuit board; for example, a so called "back-plane", in which the respective connecting ends of the casings extend in the plug-on direction of the respective connector module.

The connection of the casings, to the respective outer contact parts is, of course, not restricted to spot welding or soldering. Although spot welding is an advantageously technique, essentially any connecting method known per se, including screw thread connection, snap-in connection, riveted connection etc. can be used. The connecting ends of the casings and their respective connector may, moreover, be of a construction suitable for the surface mounting technique. In the specialist literature this is termed a "surface mounting device".

The term "printed circuit board" used above and in the claims is understood, in general, as meaning any board or substrate having electrically conducting tracks or paths, that is to say, for example, also a substrate of a liquid-crystal display and the like.

I claim:

[1. A coax connector module for mounting to a circuit substrate comprising:

a housing of electrically insulating material having a contact side for mating with another connector and a connecting side for mounting on said circuit substrate;

a plurality of electrical contact elements of electrically conductive material arranged in rows and columns in said housing and extending from the contact side to the connecting side, each contact element having a contact end portion disposed at said contact side and a connecting end portion extending from said connecting side, each contact end portion formed of coaxial inner and outer parts, each connecting end portion being an end portion of an electrical terminal which extends to and electrically connects to the inner coaxial part of said contact end portion of the contact element; and a plurality of shield members of electrically conductive material disposed adjacent one another at the connecting side of the housing and extending within the housing, each shield member mechanically connecting and electrically contacting with the outer coaxial part of the contact end portion of a respective contact element, said shield members surrounding said terminals in an electrically insulating manner, adjacent shield members in a column of contact elements having at least partially common walls to surround the contact elements in said column, said shield members each having at least one connecting end portion similar to said terminal for mounting on said circuit board substrate.]

2. The coax connector module of claim 1 wherein each shield member is constructed from sheet metal and the terminal is disposed therein and insulated from the surrounding shield member by insulating material.

3. The coax connector module of claim 1 wherein the shield member is formed from a machined block of metal and the terminal is disposed therein and insulated from the surrounding shield member by insulating material.

4. The coax connector module of claim 1 wherein the shield members are box-like and L-shaped, the connecting end portion of said shield member extending from one end of said L-shaped member and at least one contact lip for contacting said outer coaxial part of the contact element extending from another end of said L-shaped member.

5. The coax connector module of claim 4 wherein the shield members each have a pair of parallel contact lips for electrically contacting and mechanically connecting the shield member to the outer coaxial contact part of the contact element and wherein the shield members each have a pair of connecting end portions for mounting to the circuit substrate to form alternate rows with the connecting end portions of the contact elements when mounted on the circuit substrate.

6. The coax connector module of claim 5 wherein the pair of parallel contact lips are formed by extensions of two opposing, side-walls of said shield member and said contact lips are spot welded to the outer coaxial contact part.

7. A *casing for a* coaxial connector module adapted to connect terminals between conductors on a circuit substrate and *the inner conductor* of coaxial contact elements of [a] *the coaxial* connector *module*, comprising:

a first conductive shield member *mounted to one of the coaxial contact elements and* formed to at least partially shield one of said terminals *extending from the one coaxial contact element*; and a second conductive shield member cooperating with said first conductive shield member so that said one terminal is substantially surrounded by a combination of said first and second conductive shield members and *so that said first and second conductive shield members share a common wall therebetween.*

*8. The casing of claim 9, wherein said first and second conductive shield members are adapted to be mounted on circuit substrate to effect said cooperation therebetween.*

*9. The casing of claim 7, wherein said first and second conductive shield members are integrally formed within a block of conductive material and wherein said block has a common wall shared by said first and second conductive shield members.*

*10. The casing of claim 7, wherein said first and second conductive shield members are defined by box-like structures.*

*11. The casing of claim 10, wherein said first conductive shield member comprises at least three connected walls forming a portion of said box-like structure with an opening in one side of said box-like structure and wherein said second conductive shield member comprises four connected walls forming said box-like structure, at least one of said walls of said second conductive shield member being received in said opening of said first conductive shield member and serving as a common wall of both first and second conductive shield members.*

*12. The casing of claim 7, wherein said first and second conductive shield members each have a first leg and a second leg connected together to form an L-shape.*

*13. The casing of claim 12, wherein said first and second legs are defined by box-like structures.*

*14. The casing of claim 7, wherein each of said terminals has a first end that terminates in one of said coaxial contact elements and a second end that terminates in a connection means for electrically connecting to one of the conductors on the circuit substrate, said casing having a substrate side and a connector side wherein said connection means extends outside of the casing from the substrate side, said first conductive shield member and said second conductive shield member each comprise a number of connecting ends extending from opposing edges of the substrate side for connecting the shield members to the circuit substrate, said connecting ends being arranged to provide a substantially equal mutual pitch distance with the connection means.*

*15. The casing of claim 14, wherein the first and second shield members cooperate to substantially surround two terminals and wherein a first connection means associated with one of the two terminals is situated between a first set of connecting ends and a second connection means associated with the other of the two terminals is situated between a second set of connecting ends, each set of connecting ends comprises four connecting ends with two connecting ends being common to each of said sets.*

*16. A casing for a coaxial connector module adapted to connect terminals between conductors on a circuit substrate and the inner conductor of* coaxial contact elements supported in a plurality of passages in an insulative housing of the coaxial connector module, comprising:

*a conductive casing block with a substantially rectangular shape and having a plurality of parallel spaced terminal-receiving passages forming common walls therebetween, the passages extending from a connecting side of the casing block to a substrate side of the casing block, wherein the connecting side and the substrate side are adjacent to one another and said passages are substantially L-shaped said L-shaped passages being aligned with the passages of the housing on the connecting side of the casing block.*

*17. The casing of claim 16, further comprising:*

*a plurality of coaxial contact elements each being connected to a respective one of the plurality of passages and extending from the connecting side;*

*a plurality of terminals each being coupled to a respective one of the plurality of coaxial elements and extending through the respective passage and out from the substrate side, the terminals being individually shielded by the casing block and at least one of the common walls.*

*18. A coaxial connector module comprising:*

*a number of conductive casings, each conductive casing forming a plurality of substantially enclosed passages between a first end and a second end of each said casing;*

*a plurality of coaxial contact elements mounted on said casing such that each of said coaxial contact elements extends from a respective one of said passages beyond the second end of said casing;*

*an insulative housing having a plurality of channels for receiving said coaxial contact elements,*

*wherein said channels are arranged in a predetermined array of rows and columns and wherein said passages are formed in an array of rows and columns to correspond to said predetermined array of rows and columns and wherein said conductive casing forms a single column of passages therein such that the number of passages corresponds to the number of rows in said predetermined array of rows and columns and said number of said conductive casings being substantially equal to the number of columns in said predetermined array of rows and columns.*

*19. The coaxial connector module of claim 18, wherein said coaxial contact elements and respective channels are adapted to provide a multiplicity of arrangements of rows and columns.*

*20. The coaxial connector module of claim 18, wherein said casing comprises:*

*a plurality of conductive shield members cooperating to form said passages.*

*21. The coaxial connector module of claim 20, wherein said plurality of conductive shield members have a box-like shape and wherein said passages formed by said plurality of conductive shield members are L-shaped, the coaxial connector further comprising:*

*a plurality of terminals such that each of said plurality of terminals is connected to a corresponding one of said plurality of coaxial contact elements and extends through said respective one of said passages.*

*22. A coaxial connector module comprising:*

*a conductive casing forming a plurality of substantially enclosed passages between a first end and a second end of said casing;*

*a plurality of coaxial contact elements mounted on said casing such that each of said coaxial contact elements extends from a respective one of said passages beyond the second end of said casing;*

*an insulative housing having a plurality of channels for receiving said coaxial contact elements; and*

*locking means for locking the conductive casing to the housing.*

*23. The coaxial connector module of claim 22, wherein said channels are arranged in a predetermined array of rows and columns and wherein said passages are formed in an array of rows and columns to correspond to said predetermined array of rows and columns.*

*24. A coaxial connector module comprising:*

*a conductive casing forming a plurality of substantially enclosed passages between a first end and a second end of said casing; and*

*a plurality of coaxial contact elements mounted on said casing such that each of said coaxial contact elements extends from a respective one of said passages beyond the second end of said casing wherein said coaxial contact elements have latching means connected thereto; and*

*an insulative housing having a plurality of channels for receiving said coaxial contact elements.*

*25. The coaxial connector module of claim 24, wherein each said channel forms a cylinder-like passageway through said housing and is provided with at least one recess formed around the perimeter of said passageway along a portion thereof such that said latching means engage said recess when said contact element is received in said channel to lock said contact element to said housing.*

*26. A coax connector module for mounting to a circuit substrate comprising:*

*a housing of electrically insulating material having a contact side for mating with another connector and a connecting side for mounting on said circuit substrate;*

*a plurality of electrical contact elements of electrically conductive material disposed in said housing and extending from the contact side to the connecting side, each contact element having a contact end portion disposed at said contact side and a connecting end portion extending from said connecting side, each contact end portion formed of coaxial inner and outer parts, each connecting end portion being an end portion of an electrical terminal which extends to and electrically connects to the inner coaxial part of said contact end portion of the contact element; and*

*a plurality of shield members of electrically conductive material disposed adjacent one another at the connecting side of the housing and extending within the housing, each shield member mechanically connecting and electrically contacting with the outer coaxial part of the contact end portion of a respective contact element, said shield members surrounding said terminals in an electrically insulating manner, said shield members each having at least one connecting end portion similar to said terminal for mounting on said circuit board substrate and wherein one or more contact elements, including the coaxial inner and outer contact parts and the terminal, are disposed within one shield member and together with the shield member form a separate unit with latching means which can be inserted and locked in said housing as a unit.*

*27. The coax connector module of claim 26 wherein said latching means include lips projecting from an outer surface of said coaxial outer contact part of said contact element, said projecting lips have a free end which engage corresponding recesses in the housing to lock said unit in said housing.*

* * * * *

UNITED STATES PATENT AND TRADEMARK OFFICE

CERTIFICATE OF CORRECTION

PATENT NO. : RE. 36,065
DATED : January 26, 1999
INVENTOR(S) : Derek Andrews and Georg Mayer It is certified that error appears in the above-identified patent and that said Letters Patent is hereby corrected as shown below:

Column 7,
Line 18, please delete "[";
Line 46, please delete "]";

Column 8, line 5 to Column 10, line 65,
Please replace the text beginning with "7. A" with the following:

" [7. A coax connector module for mounting to a circuit substrate comprising;

a housing of electrically insulating material having a contact side for mating with another connector and a connecting side for mounting on said circuit substrate;

a plurality of electrical contact elements of electrically conductive material disposed in said housing and extending from the contact side to the connecting side, each contact element having a contact end portion disposed at said contact side and a connecting end portion extending from said connecting side, each contact end portion formed of coaxial inner and outer parts, each connecting end portion being an end portion of an electrical terminal which extends to and electrically connects to the inner coaxial part of said contact end portion of the contact element; and a plurality of shield members of electrically conductive material disposed adjacent one another at the connecting side of the housing and extending within the housing, each shield member mechanically connecting and electrically contacting with the outer coaxial part of the contact end portion of a respective contact element, said shield members surrounding said terminals in an electrically insulating manner, said shield members each having at least one connecting end portion similar to said terminal for mounting on said circuit board substrate and wherein one or more contact elements, including the coaxial inner and outer contact parts and the terminal, are disposed within one shield member and together with the shield member form a separate unit with latching means which can be inserted and locked in said housing as a unit.

8. The coax connector module of claim 7 wherein said latching means include lips projecting from an outer surface of said coaxial outer contact part of said contact element, said projecting lips have a free end which engage corresponding recesses in the housing to lock said unit in said housing.]

---

*9. A casing for a coaxial connector module adapted to connect terminals between conductors on a circuit substrate and the inner conductor of coaxial contact elements of the coaxial connector module, comprising:*

*a first conductive shield member mounted to one of the coaxial contact elements and formed to at least partially shield one of said terminals extending from the one coaxial contact element; and*

*a second conductive shield member cooperating with said first conductive shield member so that said one terminal is substantially surrounded by a combination of said first and second conductive shield members and so that said first and second conductive shield members share a common wall therebetween.*

*10. The casing of claim 9, wherein said first and second conductive shield members are adapted to be mounted on said circuit substrate to effect said cooperation therebetween.*

*11. The casing of claim 9, wherein said first and second conductive shield members are integrally formed within a block of conductive material and wherein said block has a common wall shared by said first and second conductive shield members.*

*12. The casing of claim 9, wherein said first and second conductive shield members are defined by box-like structures.*

*13. The casing of claim 12, wherein said first conductive shield member comprises at least three connected walls forming a portion of said box-like structure with an opening in one side of said box-like structure and wherein said second conductive shield member comprises four connected walls forming said box-like structure, at least one of said walls of said second conductive shield member being received in said opening of said first conductive shield member and serving as a common wall of both first and second conductive shield members.*

*14. The casing of claim 9, wherein said first and second conductive shield members each have a first leg and a second leg connected together to form an L-shape.*

*15. The casing of claim 14, wherein said first and second legs are defined by box-like structures.*

---

UNITED STATES PATENT AND TRADEMARK OFFICE

CERTIFICATE OF CORRECTION

PATENT NO. : RE. 36,065
DATED : January 26, 1999
INVENTOR(S) : Derek Andrews and Georg Mayer It is certified that error appears in the above-identified patent and that said Letters Patent is hereby corrected as shown below:

Column 8, line 5 to Column 10, line 65 (cont'd),

*16. The casing of claim 9, wherein each of said terminals has a first end that terminates in one of said coaxial contact elements and a second end that terminates in a connection means for electrically connecting to one of the conductors on the circuit substrate, said casing having a substrate side and a connector side wherein said connection means extends outside of the casing from the substrate side, said first conductive shield member and said second conductive shield member each comprise a number of connecting ends extending from opposing edges of the substrate side for connecting the shield members to the circuit substrate, said connecting ends being arranged to provide a substantially equal mutual pitch distance with the connection means.*

*17. The casing of claim 16, wherein the first and second shield members cooperate to substantially surround two terminals and wherein a first connection means associated with one of the two terminals is situated between a first set of connecting ends and a second connection means associated with the other of the two terminals is situated between a second set of connecting ends, each set of connecting ends comprises four connecting ends with two connecting ends being common to each of said sets.*

*18. A casing for a coaxial connector module adapted to connect terminals between conductors on a circuit substrate and the inner conductor of coaxial contact elements supported in a plurality of passages in an insulative housing of the coaxial connector module, comprising:*

*a conductive casing block with a substantially rectangular shape and having a plurality of parallel spaced terminal-receiving passages forming common walls therebetween, the passages extending from a connecting side of the casing block to a substrate side of the casing block, wherein the connecting side and the substrate side are adjacent to one another and said passages are substantially L-shaped said L-shaped passages being aligned with the passages of the housing on the connecting side of the casing block.*

*19. The casing of claim 18, further comprising:*

*a plurality of coaxial contact elements each being connected to a respective one of the plurality of passages and extending from the connecting side;*

*a plurality of terminals each being coupled to a respective one of the plurality of coaxial elements and extending through the respective passage and out from the substrate side, the terminals being individually shielded by the casing block and at least one of the common walls.*

*20. A coaxial connector module comprising:*

*a number of conductive casings, each conductive casing forming a plurality of substantially enclosed passages between a first end and a second end of each said casing;*

*a plurality of coaxial contact elements mounted on said casing such that each of said coaxial contact elements extends from a respective one of said passages beyond the second end of said casing;*

*an insulative housing having a plurality of channels for receiving said coaxial contact elements,*

*wherein said channels are arranged in a predetermined array of rows and columns and wherein said passages are formed in an array of rows and columns to correspond to said predetermined array of rows and columns and wherein said conductive casing forms a single column of passages therein such that the number of passages corresponds to the number of rows in said predetermined array of rows and columns and said number of said conductive casings being substantially equal to the number of columns in said predetermined array of rows and columns.*

*21. The coaxial connector module of claim 20, wherein said coaxial contact elements and respective channels are adapted to provide a multiplicity of arrangements of rows and columns.*

*22. The coaxial connector module of claim 20, wherein said casing comprises:*

*a plurality of conductive shield members cooperating to form said passages.*

*23. The coaxial connector module of claim 22, wherein said plurality of conductive shield members have a box-like shape and wherein said passages formed by said plurality of conductive shield members are L-shaped, the coaxial connector further comprising:*

*a plurality of terminals such that each of said plurality of terminals is connected to a corresponding one of said plurality of coaxial contact elements and extends through said respective one of said passages.*

*24. A coaxial connector module comprising:*

*a conductive casing forming a plurality of substantially enclosed passages between a first end and a second end of said casing;*

*a plurality of coaxial contact elements mounted on said casing such that each of said coaxial contact elements extends from a respective one of said passages beyond the second end of said casing;*

*an insulative housing having a plurality of channels for receiving said coaxial contact elements; and*

*1ocking means for locking the conductive casing to the housing.*

UNITED STATES PATENT AND TRADEMARK OFFICE

CERTIFICATE OF CORRECTION

PATENT NO. : RE. 36,065
DATED : January 26, 1999
INVENTOR(S) : Derek Andrews and Georg Mayer It is certified that error appears in the above-identified patent and that said Letters Patent is hereby corrected as shown below:

Column 8, line 5 to Column 10, line 65 (cont'd),

*25. The coaxial connector module of claim 24, wherein said channels are arranged in a predetermined array of rows and columns and wherein said passages are formed in an array of rows and columns to correspond to said predetermined array of rows and columns.*

*26. A coaxial connector module comprising:*

*a conductive casing forming a plurality of substantially enclosed passages between a first end and a second end of said casing; and*

*a plurality of coaxial contact elements mounted on said casing such that each of said coaxial contact elements extends from a respective one of said passages beyond the second end of said casing wherein said coaxial contact elements have latching means connected thereto; and*

*an insulative housing having a plurality of channels for receiving said coaxial contact elements.*

*27. The coaxial connector module of claim 26, wherein each said channel forms a cylinder-like passageway through said housing and is provided with at least one recess formed around the perimeter of said passageway along a portion thereof such that said latching means engage said recess when said contact element is received in said channel to lock said contact element to said housing.*

---

*28. A coax connector module for mounting to a circuit substrate comprising:*

*a housing of electrically insulating material having a contact side for mating with another connector and a connecting side for mounting on said circuit substrate;*

*a plurality of electrical contact elements of electrically conductive material disposed in said housing and extending from the contact side to the connecting side, each contact element having a contact end portion disposed at said contact side and a connecting end portion extending from said connecting side, each contact end portion formed of coaxial inner and outer parts, each connecting end portion being an end portion of an electrical terminal which extends to and electrically connects to the inner coaxial part of said contact end portion of the contact element; and*

*a plurality of shield members of electrically conductive material disposed adjacent one another at the connecting side of the housing and extending within the housing, each shield member mechanically connecting and electrically contacting with the outer coaxial part of the contact end portion of a respective contact element, said shield members surrounding said terminals in an electrically insulating manner, said shield members each having at least one connecting end portion similar to said terminal for mounting on said circuit board substrate and wherein one or more contact elements, including the coaxial inner and outer contact parts and the terminal, are disposed within one shield member and together with the shield member form a separate unit with latching means which can be inserted and locked in said housing as a unit.*

*29. The coax connector module of claim 28 wherein said latching means include lips projecting from an outer surface of said coaxial outer contact part of said contact element, said projecting lips have a free end which engage corresponding recesses in the housing to lock said unit in said housing.*

---

Signed and Sealed this

Seventh Day of September, 2004

JON W. DUDAS
*Director of the United States Patent and Trademark Office*